United States Patent [19]

Schnellinger et al.

[11] Patent Number: 5,642,513

[45] Date of Patent: Jun. 24, 1997

[54] METHOD AND APPARATUS FOR MULTIPLE AUTOROUTER RULE LANGUAGE

[75] Inventors: William R. Schnellinger, Plano; Sidney D. Sorenson, Dallas, both of Tex.

[73] Assignee: Eastman Kodak Company, Rochester, N.Y.

[21] Appl. No.: 720,272

[22] Filed: Sep. 26, 1996

Related U.S. Application Data

[63] Continuation of Ser. No. 184,821, Jan. 19, 1994, abandoned.

[51] Int. Cl.$^6$ .................................................. G06F 17/00
[52] U.S. Cl. .................................................. 395/705
[58] Field of Search .................................. 395/650, 700, 395/419.03

[56] References Cited

U.S. PATENT DOCUMENTS

| | | | |
|---|---|---|---|
| 4,315,309 | 2/1982 | Coli | 343/705 |
| 4,833,625 | 5/1989 | Fisher et al. | 364/518 |
| 4,893,270 | 1/1990 | Beck et al. | 364/400 |
| 5,065,315 | 11/1991 | Garcia | 364/413.01 |
| 5,077,666 | 12/1991 | Brimm et al. | 364/413.02 |
| 5,140,518 | 8/1992 | Ema | 364/413.01 |
| 5,175,684 | 12/1992 | Chong | 364/419.03 |
| 5,235,510 | 8/1993 | Yamada et al. | 364/413.02 |
| 5,270,530 | 12/1993 | Godlewski et al. | 250/208.1 |
| 5,359,512 | 10/1994 | Nishihara | 364/413.01 |
| 5,465,373 | 11/1995 | Duensing et al. | 395/800 |

OTHER PUBLICATIONS

Purtilo et al., Automatic Generation of Visualization Code for the Connection Machine, 1990, pp. 158–161. IEEE Pub.
Eastman Kodak Company, *Improve Image Consistency for Intensive Care*, Health Sciences Division, Rochester, 1992.
*PDS User's Guide*, 950–00039–010A, Vortech Data, Inc., Richardson, Texas.
*Vendor Protocol Auto Router*, Software Requirement and Functional Specification, 150–0095–010–A, Sep. 11, 1993.

*Primary Examiner*—Kevin A. Kriess
*Assistant Examiner*—John Q. Chavis
*Attorney, Agent, or Firm*—William F. Noval

[57] ABSTRACT

A method and apparatus for determining destinations for digital imagery. The automated routing process accesses routing elements in a digital image message header and processes the elements through a Multiple Autorouter Rule Language program. The method and apparatus collects data from the image's header, processes it within rules in a MAR language file, and creates a multiple destination list used to route the image.

7 Claims, 3 Drawing Sheets

Microfiche Appendix Included
(2 Microfiche, 45 Pages)

METHOD AND APPARATUS FOR MULTIPLE AUTOROUTER RULE LANGUAGE

This is a Continuation of application Ser. No. 08/184,821, filed 19 Jan. 1994, now abandoned.

COPYRIGHT NOTIFICATION

A potion of the disclosure of this patent document contains material which is subject to copyright protection. The copy owner has no objection to the facsimile reproduction by anyone of the patent document or the patent disclosure, as it appears in the Patent and Trademark Office patent file or records, but otherwise reserves all copyright rights whatsoever.

TRADEMARK NOTIFICATION

IARS, MIG, and PDS are registered trademarks of Kodak Health Imaging Systems, Inc. Apple and Macintosh are registered trademarks of Apple Computer, Inc. Sun Microsystems and Sun Workstation are a registered trademarks of Sun Microsystems, Incorporated. UNIX is a trademark of AT&T Bell Laboratories. Motif is a trademark of the Open Software Foundation.

CROSS-REFERENCE TO RELATED APPLICATIONS

This application is related to the following patent applications: U.S. Ser. No. 07/982,388, now abandoned, entitled "A Method and Apparatus for Composing Medical Imagery" by Paul H. Roewer, filed Nov. 25, 1992 and assigned to Vortech Data, Inc.; U.S. Ser. No. 07/982,090, entitled "A Method and Apparatus for Laser Printer Networking and Printer Interconnecting for Forwarding and Printing of Medical Imagery", by Alan Pimm, Eric Shields, and Mark Wofford, filed Nov. 25, 1992 and assigned to Vortech Data, Inc.; U.S. Ser. No. 08/048,290, now abandoned, entitled "Intelligent Automated Medical Image Data" by William Schnellinger, Vinayak Lawande, and Gerald Deutsch, filed Apr. 1, 1993 assigned to Vortech Data Inc. which application is hereby incorporated by reference; U.S. Ser. No. 08/125,283 entitled "A method and Apparatus for Data Acquisition and Storage in a Picture Archival and Communication System" by Brian A. Lind, filed Sep. 22, 1993 assigned to Eastman Kodak, Inc.

Software Microfiche Appendix

This specification includes a software micro fiche appendix consisting of two fiche compri sing of forty-five frames.

BACKGROUND OF THE INVENTION

1. Field of the Invention

The present invention relates to the field of digital medical imagery and in particular to the automated routing of digitized medical images from a plurality of image sources or modalities, to a plurality of destinations using a multiple rules language to determine the destinations in accordance with an incoming image data set.

2. Description of the Related Art

Digital medical imaging systems provide for the generation, storage, transportation, processing, and presentation of digitized medical images in health care facilities. These systems have become an integral part of hospital management systems. Digital medical imaging systems are referred to as picture archiving and communication systems (PACS). In the past, raw radiographic data or x-ray film was distributed manually to radiologists. Radiographs were copied and hand delivered to the physicians and radiologists. Otherwise, the physician came to the radiology department to view the x-ray film. Manual delivery is not always practical. Physicians require imagery quickly to determine the best course of treatment for a patient. Utilizing a PACS connected to image sources and destinations via a digital network enables hospitals to send images to a plurality of destinations. Destinations typically comprise workstations, archival facilities, printers or other equipments defined as a network destination. PACS were initially developed to provide improved image accessibility, reduced image handling overhead, reduced costs and improved diagnostic image quality. PACS have become widely accepted. The tremendous mount of data involved in PACS present a new set of problems related to limited storage, processing and network transmission delays which can present unacceptably long response times to physicians who issue an image viewing request.

Contemporary hospitals and diagnostic clinics utilize PACS digital medical imagery to acquire, analyze, study, and store medical imagery. Typically, medical imagery is generated by a variety of source devices or modalities such as x-ray machines and magnetic resonance imaging devices. Medical imagery source devices typically connect directly to dedicated readers, printers and storage devices. Medical imagery, however, is ideally distributed to a variety of locations for viewing, printing or storage. Thus, a dedicated transmission line is inappropriate. A major advantage of digital imaging systems is the ability to directly transmit an image to multiple locations.

Typical digital imaging systems however have imposed limitations on the selection criteria for determining destination(s) for a medical image. Typical digital imaging systems utilize software processes which rely on a single element in a message to designate a single destination. Use of a single element limits the number of destination points to which an image is sent. Moreover, an image destination is defined only if the single element matches a selection criterion. Physicians, however, typically move between different areas of a hospital or to off-site facilities. Moreover, their varied work schedules dictate flexibility in where an image should be sent. Thus, the single element designation designator is too restrictive to accommodate flexibility in determining a destination. Thus, this typical digital imagery system is too restrictive to accommodate most health care environments.

Typical digital imaging systems require human intervention to effectuate movement of medical images to their appropriate destination(s). The user interface for image movement is typically awkward. Typical user interfaces confuse the user, making the system difficult to operate. User input commands require numerous keystrokes and involve tedious command formats. Thus, the typical user interface actually induces operator errors which can delay image transmission. Also, due to the spate of devices and different vendor protocols, the typical digital imaging system does not provide the ability to transmit to equipments that are not compatible with a particular system or those located on another network.

Workstation operators who may be experts in their chosen medical field, are often less than computer-literate and have no desire to become so. These operators (hospital technologists, radiologists, attending or consulting physicians) typically focus on the tasks of accessing, viewing, displaying and printing medical imagery. They are frustrated by the task of routing, deleting and maintaining medical images and destination points for physicians which has become cumbersome.

Thus there is a need for a simple, automated routing process that automatically determines multiple destination points and criteria specific for a particular image.

SUMMARY OF THE INVENTION

The present invention provides a method and apparatus for automatically routing digital imagery over a network. The present provides a plurality of routing elements which are utilized to automatically determine a destination for the imagery. A set of rules is provided to process the routing elements to determine the destination. The rules are user programmable. The routing elements also provide access to a database for obtaining additional information regarding routing of imagery to a destination. Thus, the present invention provides a method and apparatus designed to address the problems of typical systems discussed above.

The present invention increases speed, provides an efficient work flow, maximizes the use of image modalities, image viewing workstations and printers. The present invention minimizes human intervention, thus reducing health care costs. The present invention provides a transparent multiple rule language interface method and apparatus that provides predefined variables, conditions and image destination rules which, when matched with the image criteria data automatically builds a list of destinations and routing criteria for an image. Thus, incoming images are routed to their appropriate destination without human intervention.

The present invention provides a programming language, Multiple Autorouter Rule (MAR), which is particularly adaptable to perform compound comparisons upon the basic elements of an ACR-NEMA image message header. The rules of the present invention are particularly adaptable to enable a user to define destinations and rules for routing digital medical images to workstations, printers and archives on a local network or between networks. The present invention provides a method and apparatus for updating, deleting or defining routing rules. The present invention provides access to remote and local information service databases which provide additional routing criteria. The present invention also provides additional capabilities as shall become evident from the following specification.

DETAILED DESCRIPTION OF A PREFERRED EMBODIMENT

Figure 1:
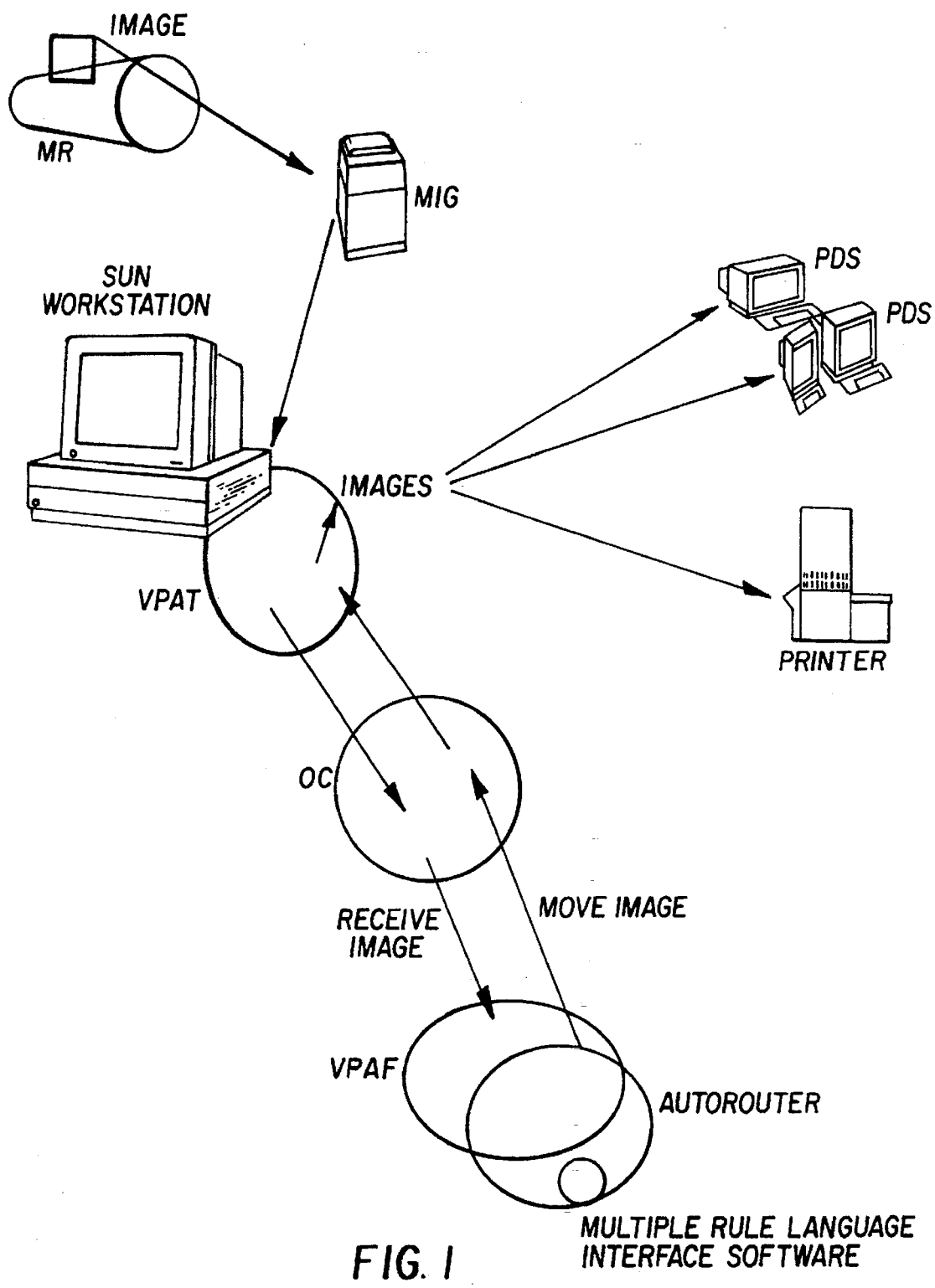
FIG. 1 is a schematic block diagram of a hardware environment for a preferred embodiment of the present invention.

The present invention will be further clarified by consideration of the following example of a preferred embodiment, which is intended to be exemplary of the present invention.

In a preferred embodiment, the present invention provides an apparatus and method as an addition to a Picture Archival and Communication System (PACS). In a preferred embodiment the invention is added to the Personal Display Station (PDS), provided by Kodak Health Imaging Systems, Inc. of Richardson, Tex. A preferred embodiment of the present invention receives digitized medical image messages based upon the protocol of American College of Radiology-National Electrical Manufacturers Association (ACR-NEMA). The present invention routes the images over a network to be viewed or edited on a work station, stored or printed. The present invention provides a multiple rule method and apparatus which automatically builds an image destination list for each image received. The destinations are based upon group elements located in the ACR-NEMA message header. The rules in the MAR programing language are selected or defined by the user, who customizes the rules to suit the specific operating environment. An example of a set of MAR rules appears in the Appendix.

The present invention enables health care facilities to automatically move images from a particular image source to multiple destinations based on a plurality of criteria such as time of day, day of week, and location, without human intervention. The user creates a MAR file of rules which guides an image to its appropriate destination. The MAR language enables a user to customize the MAR rules to the specific environment.

The present invention generates a destination list in accordance with the rules in a MAR language file. A preferred embodiment receives the MAR file, designates destinations as defined by the rules in the MAR language, and routes the image according to the criteria. A preferred embodiment also considers status of the network(s) and the input sources. The present invention provides retry methods, as discussed in the related patent application entitled "Intelligent Automated Medical Image Data Routing" filed Apr. 14, 1993, Ser. No. 08/048,290, and assigned to Kodak Health Imaging Systems, Inc.

The present invention provides a simple menu driven method and apparatus to enable the user to update, delete, or create a MAR language file. After the MAR language file has been updated, an autorouter process is restarter at a specified appropriate time. Thus, images are not lost due to interruption of the process during image transmission.

The MAR language of the present invention is integrated into an image routing process. The MAR rules are transparent to the user. As an image is received, the MAR language rules are executed by the routing process. The MAR process matches a defined group/element structure with criteria in the image message header. The MAR rules are utilized to create a list of destinations for the image. There are 3 basic functions in the MAR process. The first function initializes the MAR rules and software routines and sets up the MAR variables and conditions. The second function collects and sets up information specific to each image from the ACR-NEMA Leader. The third function executes the functionality from the MAR language rules and creates the destination list for the image. The first function is performed during system initialization. The second and third functions are performed on a per image basis. As part of the process, the MAR language provides the capability access information databases to access additional destination criteria. Additional criteria comprise physician and patient locations.

Once MAR generates an image destination list, the routing process accesses the destination list and then distributes the image to the destinations in accordance with the destination list. The present invention then clears the destination list and waits for another incoming image.

As shown in FIG. 1, in a preferred embodiment, the present invention comprises a UNIX based host computer that runs a Sun operating system, version 4.0.1 or greater. The host computer system provides a data processor and storage resources, such as magnetic disk and Random Access Memory (RAM). A Medical Image Gateway (MIG) is provided which enables movement of images to an autorouter directory. An Output Control (OC) process handles communications between processes. A Vendor Protocol ACR/NEMA-to-TCP/IP (VPAT) process transfers the digitized medical images over a network. An Autorouter process accepts the image move request and creates an image transmission request.

MIG

A Medical Imaging Gateway (MIG) provides a platform for the movement of diagnostic quality images at high speeds between different locations. The MIG provides an interface between the source of medical images (the image generators), image display workstations, and imaging networks. In a preferred embodiment, the MIG attaches different transmission equipments through a standard RS-449 interface, running a protocol available from Kodak Health Imaging System, Inc., Richardson, Tex. The transmission media can be satellite-based communications over an Image Transmission Network (ITN), dedicated fiber optic lines, or some other form of data transmission network.

The MIG device is a gateway which provides an image device interface. The MIG also provides for compression/ expansion of data, communication control, temporary storage, and security/error checking. In a preferred embodiment the MIG is based on an industry standard UNIX platform running on a Sun computer system.

The MIG is configurable to enable a variety of hardware configurations to enable image acquisition and presentation. Disk capacity and processing speed are increased, if required, for a given installation. The MIG facilitates the transfer of image data and patient information to the transmission media.

VPAT

VPAT provides a local and wide-area gateway enabling an Imaging Equipment (IE) to communicate with the MIG. VPAT enables the MIG to communicate with other devices on the Image Transmission Network (ITN). Sending and receiving devices utilize a common data format compatible with sending and receiving devices.

Generally, the communication application layer is ACR-NEMA. The lower levels of the ACR-NEMA protocol are replaced by TCP/IP. TCP/IP enables processes running on different computers to open virtual 'ports' between them.

Output Control (OC) Process

In the MIG environment, processes communicate in a fashion similar to a star network, OC process at the center of the star. This configuration enables all processes to communicate with any number of other processes via the OC process. Utilizing the OC process position with respect to the MIG process enables centralized configuration and communications routing decisions. These features facilitate network management, and provide flexibility in the message routing mechanisms, since only one process is altered to provide a new service.

AutoRouter

In a preferred embodiment of the present invention, an autorouter provides a deterministic approach to automatic message distribution, based upon criteria for automatic routing of information to appropriate nodes within a health care system, such as the Imagelink™ system.

The Autorouter initially reads a configuration file and initializes a set of matching criteria. Autorouter reads configurable parameters such as MAR Language files, queue sizes, and wait times during initialization. Autorouter then determines routing destinations in accordance with a routing field present in the ACR-NEMA message header and determines if a MAR file is present. The autorouter utilizes the MAR rules and routing information to route imagery to the appropriate destinations.

User Interface Characteristics

The method and apparatus of a preferred embodiment of the present invention executes without user intervention. No user interface is required. However, provision is made in a preferred embodiment of the present invention to notify a user of potential problems, for example, destinations which are unresponsive. When a destination goes down, images are rerouted or delayed until the destination comes back on line.

A user-interface is provided by means of a menu driven program. The user can update, delete, or create new destinations and specific criteria requirements.

Environment

In a preferred embodiment, the present invention exists within a Vortech product/Kodak Health Imaging Systems, Inc. Vendor Protocol ACR-NEMA File system (VPAF). A preferred embodiment of the present invention is activated by placing the AUTOROUTE key to the VPAF in the utilization configuration file. A preferred embodiment of the present invention conforms to operational requirements, and memory mapped queues. A preferred embodiment utilizes a Sun operating system to determine the contents of memory and places a directory of the memory contents into a UNIX file.

Multiple Rules

The need for an automated routing process that routes images quickly to specific destination(s) using different criteria became apparent along with the advent of the numerous health care environments throughout the world. The present invention provides a new apparatus and process to provide a new routing interface process to accomplish this task. The present invention uses a high speed router that parses code quickly without variables or modifications.

The MAR is simple and efficient. MAR performs comparisons of the data. Thus, conditional expressions comprise the main portion of defined MAR words. MAR also provides for customization of routing rules. MAR enables a user to define many different objects in the ACR-NEMA header. MAR enables a user to define constants. MAR also provides "else" conditions and enables a user to define default destinations. MAR enables a user to define "always send" destination(s), i.e., destinations to which images should always be sent. MAR enables a user to define a "priority" destination, i.e., a destination to which once the image has been sent the image can be removed from another destination queue.

The MAR enables compound comparisons stemming from basic elements in an ACR-NEMA header and logical operators. It is unique in that constants are declared, rather than variables. There are no true variables within the MAR, unless they appear in the ACR_NEMA header. These variables are simple pointers to items within the header. Thus, the only variables used apply to an ACR_NEMA message elements.

The present invention's programing language structure is similar to "C". The calling method is similar to the lisp language calling method. The present invention uses the concept of the first class data element, similar to the concept as used in lisp. The concept of call items used by MAR is also similar to the concept as used in lisp. A series of atoms, which point to data structures or functions, is allowed within MAR. These atoms are called terms.

In a preferred embodiment of the present invention, a universal item which performs a set of utilities is provided. A master union is created which points to any data type. A plurality of tree structures reside in the MAR language. MAR builds one tree structure containing all string pieces. The pieces are then sorted in computer memory.

A tree of pointers is used to point to a function. The function returns status when executed to indicate whether or not the function has successfully completed. The function points to all grammar types which comprises other functions and arguments passed to the function. The result is expressed as a list of pointers to variables.

The MAR rules traverse these trees. The results are dynamic. MAR allocates memory and builds out trees that point to fixed functions. The if function is a fixed function. The if function is fully re-entrant. For example, an if function can call another if function. Since it is fully re-entrant, it is the same function running in all locations. The variables do not intermix.

The present invention provides a programming language utilizing the commercially available applications, lex and yacc (see, lex & yacc, by John R. Levine, Tony Mason & Doug Brown), to convert the source program (MAR rules) into a file that can be used by the Autorouter process. Lex is a lexical analyzer that identifies tokens or units (i.e., variable, names, constants, strings, operators, punctuation, and so forth). Lex reads a set of descriptions of possible tokens and produces a C routine. Lex predetermines that the parser will understand whatever Lex passes to the parser. For example, if lex passes an if statement, a list or a then statement, lex determines that token is an appropriate type, and is intelligible by the parser before Lex passes it to the parser.

Yacc reads a concise description of the MAR grammar and produces a C code program that parses the grammar. The yacc parser automatically detects whenever a sequence of input tokens matches one of the rules in the grammar and also detects a syntax error whenever its input does not match any of the rules yacc uses Look Ahead Left Recursive (LALR) parsing technique. The lexical analyzer is thus theoretically 100% optimized. A layer of programing in "C" code is inserted after every line of yacc code produced.

The MAR rules are well compartmentalized. The MAR grammar is handled by yacc, and 90% of the activity that is applied or handed off is handled by lex and yacc. No typing is performed on the items that remain. Using the concept of lisp, every item becomes a first class data element. For example, as soon as a pointer points to an object, it matches what it expects; if it does not point to the right object, it does not parse. Yacc makes sure that when a pointer is generated for an object, the object is appropriate for the function, i.e., name, function, list, entry to a link list, etc., are appropriate.

Since there are no variables within the program, a defined list is not modified after the destination list execution begins. The list is fixed, or "hard parsed." In a preferred embodiment, updating, changing, and deleting rules is performed in real time, preferably at a specified time when the autorouter is not running. The language triggers in order to move an image is modular, not definitive. Thus, one can change what the language triggers without affecting the MAR language.

The present invention enables a user to create, update or delete MAR rules as desired or as necessary for the operating environment. A preferred embodiment accesses the MAR rule file to set up element structures. The MAR language interface process uses the structures to define the rules using the specific data from the image.

The present invention enables a user to define customer lookup functions. The present invention provides predefined functions, e.g.; time of day, day of week, radiologist location, and patient location. The last two functions provide the capability to access other patient information databases.

The MAR language provides a library file that can be integrated into a preferred embodiment of the present invention, the Autorouter. An example of a MAR rule set is provided in the Appendix.

In a preferred embodiment, Autorouter code is generated from the compilation of the MAR Rules. When the Autorouter receives an image it executes the code generated by the MAR rules and adds the image to the proper image destination queue.

In a preferred embodiment, the present invention provides a user interface (UI) that signals a routing process (Autorouter) to compile a set of MAR rules. The present invention provides a UI which conforms to the OSF/Motif style guide. The UI enables the user to enter criteria using various soft buttons as an accelerator for entering and embedding built-in functions.

The present invention provides a user interface with pulldown menus containing all possible destinations, as defined in a preferred embodiment configuration file. An editor is provided which performs interpretive compiling of the MAR rules entered into the text area for faster debugging of the MAR rules.

MAR provides a transparent process that is accessed by the autorouter routines. MAR automates the process of defining criteria parameters and multiple destinations for a digital medical image. MAR rules enable definition of an unlimited number of destinations and deterministic parameters that can be used to route the image. The present invention is unique in its approach to providing a program language specific to routing medical images and an automated method of building a destination/criteria list.

Figure 2:
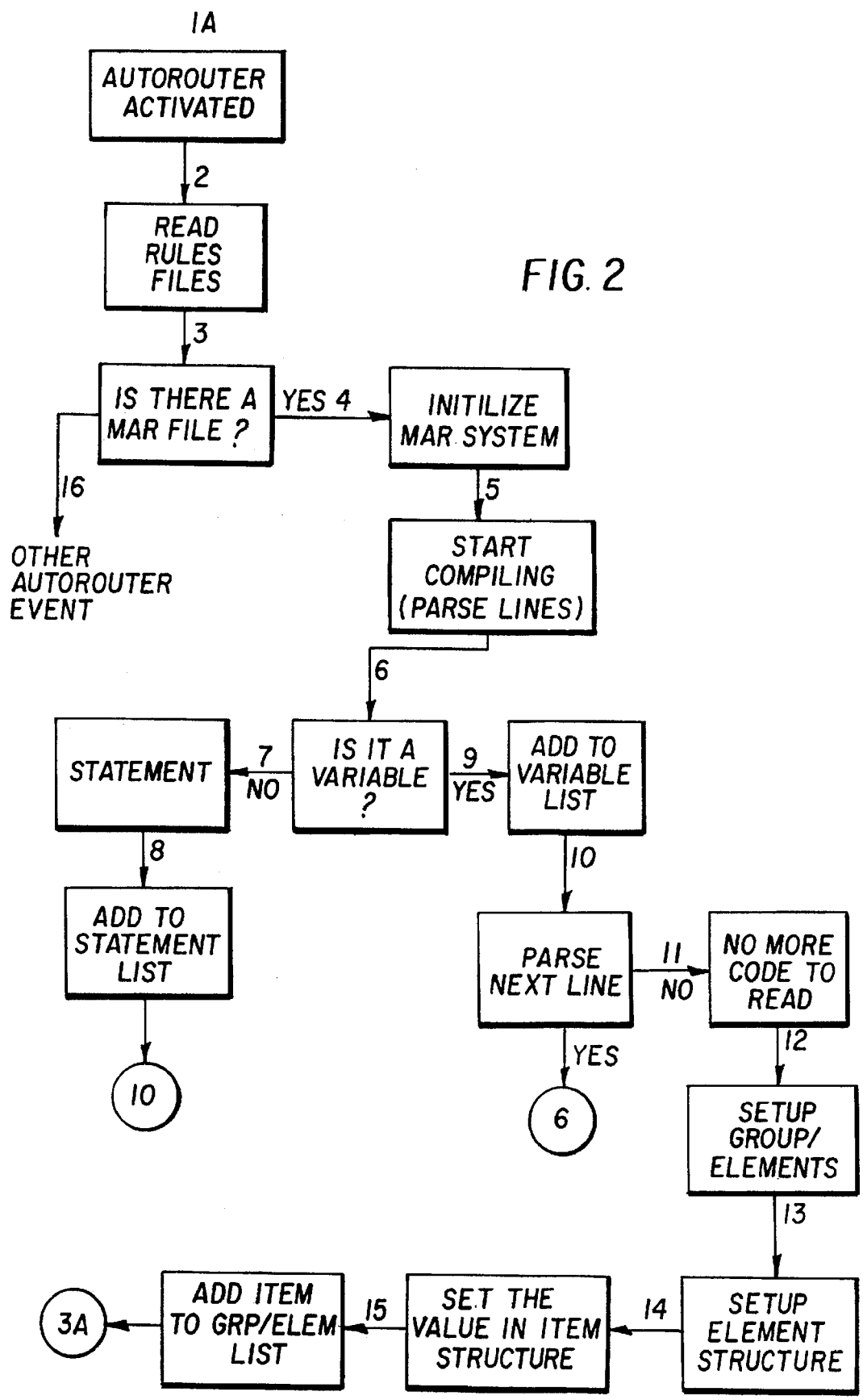
FIG. 2 is a flow chart illustrating a MAR Interface Stamp process.

In a preferred embodiment of the present invention, an autorouter is called by the Vender Protocol ACK-NEMA File (VPAF) at initialization to set up queues and to initialize functions in the timer, Autoroute__Init. Autorouter reads the MAR language rules path name to see if a MAR file exist. When a MAR file exists, the process as shown in FIG. 2 is initialized. mar__init__system refers to MAR startup process.

MAR parses (using the lex and yacc functions) the MAR rules line by line, building a variables and statements list, entitled mar__start__compiling. The present invention receives the group and element assigned values from an ACR-NEMA data-dictionary and creates an element structure, mar__set__grp__ele. A pointer is then set to the value list. This list is filled in when the image data in the ACR-NEMA header is read.

In the preferred embodiment VPAF receives an image and passes the image header information to the Autorouter event handler, Autoroute__Image. The event handler determines if there is a MAR language file present. If yes, the MAR process init__mar__system is executed. The present invention clears the destination list after every find.

Figure 3:
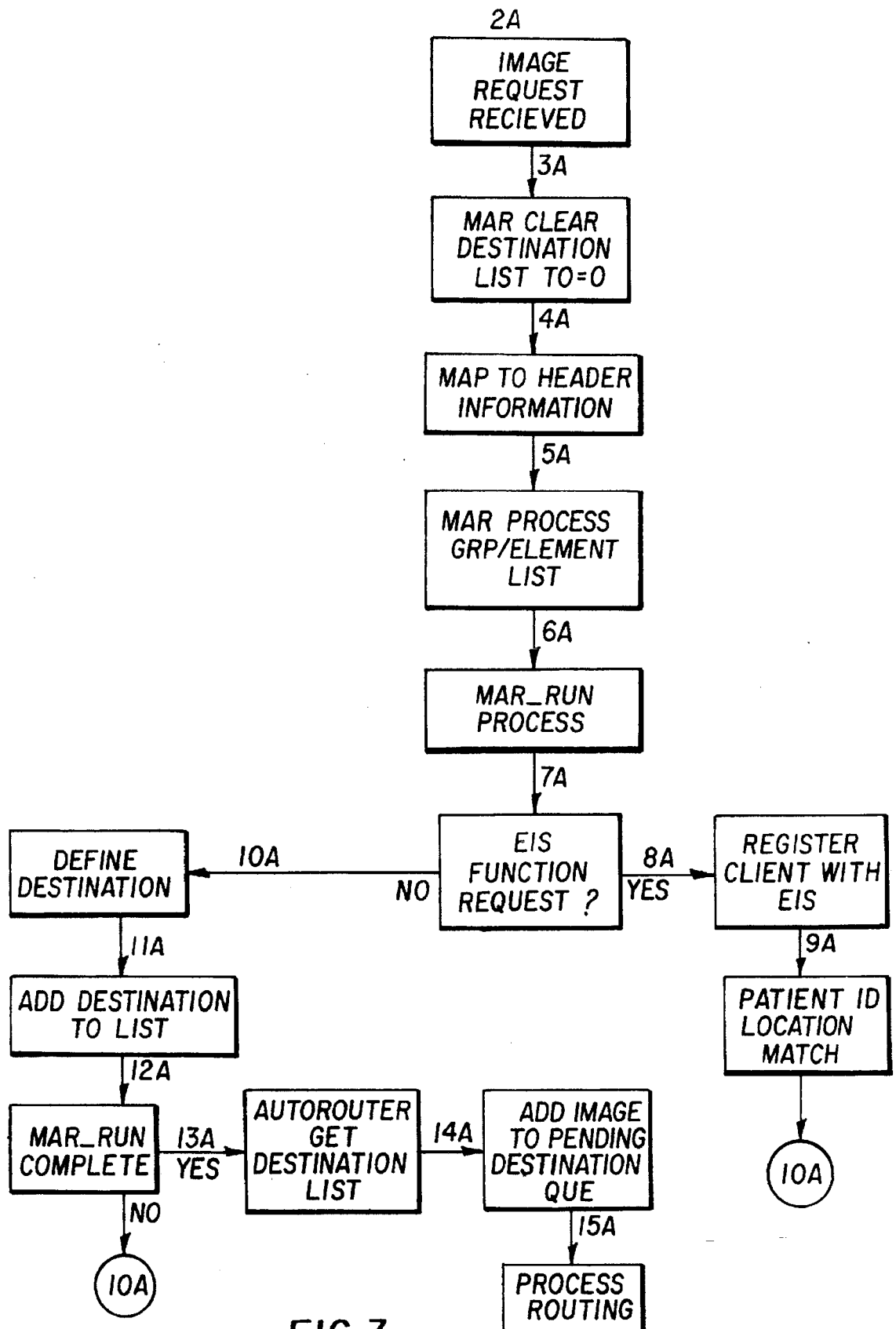
FIG. 3 is a flow chart illustrating a MAR Language Interface Run process.

The present invention creates a group/element list by matching the group/element numbers associated with the data from the header information, mar_proces_grp_ele_list. Once an element list is complete, the present invention runs the run_mar routine as shown in the MAR run process flow chart illustrated in FIG. 3. This routine runs the rules against the element list and the criteria parameters. If the condition is met, it adds a destination to the destination list, mar_add_dest_to_list. The process continues until all the rules in the file have been tested. In a preferred embodiment an event handler then adds an image transmission request to the appropriate image pending queue for each destination.

The present invention enables access to other database information services for additional criteria. If a rule requests patient location, the present invention registers as a client to the Exam Information Service (EIS), a database service that resides within a preferred embodiment's network. EIS comprises patient scheduling, routing, exam and location information. For example, if a patient location is desired, the present invention queries the EIS. If patient information is available, MAR retrieves the location of the patient and uses it as criteria to be matched. The EIS is described in U.S. patent application Ser. No. 08/125,283 entitled "A Method and Apparatus for Data Acquisition and Storage in a Picture Archival and Communication System," by Brian A. Lind, Filed Sep. 22, 1993, and assigned to Eastman Kodak.

A preferred embodiment of the present invention generates a destination list, mar_get_dest_list (NOTE: if the rule file was null the preferred embodiment goes to another function) and adds the image to the corresponding pending queue for that destination.

The preferred embodiment of the present invention executes routines to route the image to each destination according to the list of destinations that have been defined by the present invention.

It will be appreciated by those skilled in the art having the benefit of this disclosure that this invention is believed to be capable of application in other situations in which the hardware and software work in substantially the same way to achieve essentially the same result. Some of these situations have been expressly described here (as examples and not as limitations), and other will be recognized by those of skill in the art.

It is also to be understood that various modifications and changes may be made e.g., in the shape, size and arrangement of components, operating steps and so forth, without departing from the spirit and scope of the invention. For example, the MAR language could be accessed by any type of application program that is used as a routing process.

Other embodiments of the invention will be apparent to the skilled in the art from a consideration of this specification or practice of the invention disclosed herein. It is intended that the specification and examples be considered as exemplary with the true scope and spirit of the invention being indicated by the following claims.

APPENDIX A

EXAMPLE MAR FILE

Set Doctor to 0001:0012
set Radiologist to 000C:00FE
set patient_Last_Name to 0002:01015

APPENDIX A-continued

EXAMPLE MAR FILE set Patient_ID to 0005:5000

Set Home_Radiologist list to
    "George Carlin"=[homepds1]
    "Moms Maybly"=[homepds3]
    "Lana Turner"=[homepds3]
    "Eddy Murphy"=[bighouse]
    "Freddy Kruger"=[painpds13]

EndList
Set Lana_Loonies to [radpds1,radpds2,radpds15,morgpds1]
Set The_Bone_Breakers to [morgpds1,surgpds1,surgpds2,surgpds3]

Set Radiologist_Office list to
    "George Carlin"=[wrkpds1]
    "Moms Maybly"=[wrl[ds2]
    "Lana Turner"=Lanas_Loonies
    "*" =The_Bone_Breakers EndList
Set John_Hopkins to [jh_iars]
Set Seatle_Childrens_Hospital to [sch_iars]
Set George_Knowitall to [sch_pds1a]
Set Friday_on_Call_Radiologist to "Freddy Kruger"
Set Default_On_Call_Radiologist to "Eddy Murphy"
Set Backup_on_Call_Radiologist to "Moms Maybly"

Set on_Call_Location Lookup to
    if DOW = Friday and TIME > 16:45 then
        Set on_Call_Radiologist to Firday_on_Call_Radiologist
    else
        if DOW = Saturday and TIME < 08:00 then
            Set On_Call_Radiologist to
Friday_On_Call_Radiologist
    else
        Set _on_Call_Radiologist to
Default_On_Call_Radiologist
        endif
    endif
    if (TIME > 16:45 or TIME< 08:00) or
        (DOW = Saturday or DOW = Sunday) then
        Set On_Call_Locations to
            Home_Radiologist (On_Call_Radiologist)
    else
        Set On_Call_Location to
            Radiologist_Office(On_Call_Radiologist)
    endif
    if On_Call_Location = [Not Found] then
        if TIME. 16:45 or TIME < 08:00 then
            Set On_Call_Location to
            Home_Radiologist (Default_On_Call_Radiologist
    else
        Set On_Call_Location to
Radiologist_Office(Default_On_CAll_Radiologist)
        endif
    endif
EndLookup
if Patient_Last_Name = "Clinton" then
    Send to John_Hopkins Log error to [miglui]
    Send to Tina_Thinksalot Log error to [miglui]
    Send to [bitbucketpds] Log error to [miglui]
    Send To The_Bone_Breakers Log error to [miglui]
else
    Send to On_Call_Location log error to [miglui]
endif if Patient_ID,_<"Mzzz" then
    Send to [amiars] log error to Master_Archive
else
    Send to [nziars] log error to Master_Archive
endif
if"Doctor" ~ Radiologist then
    Send to The_Bone_Breakers log error to [miglui]
endif

Glossary

This glossary defines, discusses, or explains terms as they apply to the present invention. Application developers may use slightly different meanings for some of these terms, but the definitions re given from the user's point of view. Cross-references are given for related or contrasting terms.

ACR-NEMA A "standard" format designed for the interchange of images between different types of equipment. It was formalized by the American College of Radiology (ACR) and national Electrical Manufacturers Association (NEMA). The standard provides for a description of the image display format without having to modify it.

Autorouter A stand-alone process that routes medical image data to defined destinations without human intervention.

Configuration file A data file used by application software to provide information about the kind of peripheral devices and the physical/mechanical properties. It describes the devices, optional features, system or communication parameters, and other programs installed.

Data Acquisition A system that acquires images from an imaging device and makes them available to the transmission system that transfers images from one MIG to another.

Dedicated device Typically in proprietary configurations, a dedicated device is rehired to its controller. Otherwise, a dedicated device may be one such as a printer that is used only for x-ray film prints.

Disk The magnetic medium that the computer uses for storing information.

File A collection of related data stored and retrieved by an assigned name.

Format A specific arrangement of a set of data. See protocol.

Header data: Patient demographics information on machine setting, institutional demographics, and director information that enables the image database management system to locate specific images.

IE Imaging Equipment

Image data An array of grey scale values within data elements called pixels.

Industry standard communication format The medical computing industry has adopted the ACR-NEMA communication standard.

Intelligent back-off Keeps track of the destination status for each image that has not successfully been routed, scheduling image retrys to each destination according to the retry value of the destination point.

Image Images can be captured (acquired from the source modality), stored (locally, or remotely) temporarily for a short time or archived for a long time), retrieved from local or remote storage, viewed, previewed, adjusted, manipulated, and composed.

Image Pruning A configurable time for deleting images.

ITN Image Transmission Network lex A commercial tool designed for writers of compilers and interrupters.

MAR Multiple Autorouter Rules

MIG Medical Imaging Gateway, a vortech process used to route ACR-NEMA messages to their ultimate destination.

Medical diagnostic image In medical applications, images captured on film pages source of typical medical images is one or more of the radiographic, sonic, or nuclear imaging modalities.

Modality Generic term for the various kinds of medical image producing devices; for example x-ray, CAT scan, magnetic resonance, gamma cameras, or ultrasound.

Operating system A software program that organizes the actions of parts of the computer and its peripheral devices. It handles low level tasks such as memory management, port control, and disk input and output.

parse To separate data, compile.

PACS Picture archival and communication system In medical applications, a computer based system that permits the user to capture, store, retrieve, manipulate, archive, and transmit medical diagnostic images.

Parameter Information supplied by a program or user to an application program. Some applications use configuration files to store parameters for "data forms," or information about peripheral devices.

PDS Vortech Data, Inc. personal display station.

Protocols In network communication, various sets of standard rules that govern the operation of functional units of a communications system that must be followed if communication is to take place.

TCP/IP Transmission Control Protocol/Internet Protocol

UI User Interface

Unresolved directory A directory of images that do not have a defined destination to be assigned a destination point by a user interface at a later time.

variable a named area in memory that stores a value or string assigned to that variable.

Value A specific occurrence of an attribute; for example, "Sam" for a patient name. A value is the quantity assigned to constants, parameters, variables, or symbols.

VPAT Vendor Protocol ACR-NEMA over TCP/IP

Workstation In the present invention, the computer and monitor. It can be configured on a network with other Vortech systems, such as the IARS (Image Archive and Retrieval System) or MIG (Medical Image Gateway). It can be configured to work with other vendor's systems, such as Eastman Kodak's IMAGELINK.

yacc A commercial tool designed for writers of compilers and interrupters.

What is claimed is:

1. A method for routing digital medical images in conjunction with a digital imaging system comprising the steps of:

(a) accessing a set of automatically compiled adaptive routing elements of a digital image message header;

(b) creating a master union as a set of universal pointers to preferences in memory of all data types;

(c) building a function tree structure to implement a set of functions;

(d) creating a set of function pointers to the functions;

(e) providing a first set of neutral functions that point to all grammar types wherein the functions comprise a second set of functions which operate on arguments passed to the first set of function and wherein the second set of functions return a pointer which points to any data type;

(f) providing a fully re-entrant program wherein variables do not intermix;

(g) combining a commercial compiler, lex and yacc to compile a set of run-time rules: and (h) inserting "c" code after every line of yacc code.

2. The method of claim 1 further comprising the step of changing a value and specific location in memory without moving memory.

3. The method of claim 1 further comprising the step of providing a modular queuing interface and an ACR_NEMA interface pointer.

4. The method of claim 1 wherein the programming language is modular.

5. The method of claim 1 wherein the data used in the programing language is modular.

6. A method for routing digital medical images in conjunction with a digital imaging system comprising the steps of:

(a) accessing elements of a digital image message header;

(b) creating a master union as a universal pointer to all data types;

(c) building a tree structure to implement a set of functions;

(d) creating a set of pointers to the functions;

(e) providing a first set of functions that point to all grammar types wherein the functions comprise a second set of functions which operate on arguments passed to the first set of function and wherein the second set of functions return a pointer which points to any data type;

(f) providing a fully re-entrant program wherein variables do no intermix;

(g) combining a commercial compiler, lex and yacc to compile a set of rules; and (h) inserting "c" code after every line of yacc code.

7. A method for routing digital medical images in conjunction with a digital imaging system comprising the steps of:

(a) accessing a set of automatically compiled adaptive routing elements of a digital image message header;

(b) creating a master union as a set of universal pointers to preferences in memory of all data types;

(c) building a function tree structure to implement a set of functions;

(d) creating a set of function pointers to the functions;

(e) providing a first set of neutral functions that point to all grammar types wherein the functions comprise a second set of functions which operate on arguments passed to the first set of functions and wherein the second set of functions return a neutral pointer which points to any data type;

(f) providing a fully re-entrant program wherein variables do no intermix;

(g) combining a commercial compiler, lex and yacc to compile a set of run-time rules; and (h) inserting "c" code after every line of yacc code.

* * * * *